US012566845B2

(12) United States Patent
Ansari et al.

(10) Patent No.: US 12,566,845 B2
(45) Date of Patent: Mar. 3, 2026

(54) SECURING ARTIFICIAL INTELLIGENCE MODELS FOR LANE/TRAFFIC MANAGEMENT IN AN AUTONOMOUS SYSTEM

(71) Applicant: Harman International Industries, Incorporated, Stamford, CT (US)

(72) Inventors: Asadullah Ansari, Bangalore (IN); Sharath Yadav Doddamane Hemantharaja, Chitradurga (IN); Shyju Thekkumbadan, Kannur (IN)

(73) Assignee: Harman International Industries, Incorporated, Stamford, CT (US)

( * ) Notice: Subject to any disclaimer, the term of this patent is extended or adjusted under 35 U.S.C. 154(b) by 175 days.

(21) Appl. No.: 18/011,881

(22) PCT Filed: Sep. 21, 2020

(86) PCT No.: PCT/US2020/051822
§ 371 (c)(1),
(2) Date: Dec. 21, 2022

(87) PCT Pub. No.: WO2022/015347
PCT Pub. Date: Jan. 20, 2022

(65) Prior Publication Data
US 2023/0342456 A1     Oct. 26, 2023

(30) Foreign Application Priority Data
Jul. 16, 2020    (IN) .............................. 202011030333

(51) Int. Cl.
| | |
|---|---|
| *G06F 21/55* | (2013.01) |
| *G06F 21/60* | (2013.01) |
| *G06N 20/00* | (2019.01) |

(52) U.S. Cl.
CPC .......... *G06F 21/554* (2013.01); *G06F 21/602* (2013.01); *G06N 20/00* (2019.01); *G06F 2221/034* (2013.01)

(58) Field of Classification Search
CPC ................. G06F 21/554; G06F 21/602; G06F 2221/034; G06N 20/00
See application file for complete search history.

(56) References Cited

U.S. PATENT DOCUMENTS

2007/0124584 A1* 5/2007 Gupta ................... H04L 9/3271
713/180
2019/0302766 A1 10/2019 Mondello
(Continued)

FOREIGN PATENT DOCUMENTS

WO    2019/232335 A1   12/2019

OTHER PUBLICATIONS

Markus Koegel et al: "Auto update—safe and secure over-the-air (SOTA) software update for advanced driving assistance systems" In: "Fahrerassistenzsysteme 2016", Jan. 1, 2018 (Jan. 1, 2018), Springer Fachmedien Wiesbaden, Wiesbaden, XP055744729, ISSN: 2198-7432 ISBN: 978-3-658-21444-9 pp. 119-134, DOI: 10.1007/978-3-658-21444-9_9, the whole document.
(Continued)

*Primary Examiner* — Viet D Vu
(74) *Attorney, Agent, or Firm* — Angela M. Brunetti

(57) ABSTRACT
A system and method to secure lane and traffic management AI models used in an advanced driver assistance system. (ADAS) or in an autonomous vehicle. Only lane and traffic management data recognized from a verifiable source is allowed for testing and training the AI model. All other data is blocked. Controllable parameters of the AI model are encrypted prior to deployment. After deployment, the controllable parameters are decrypted and only signature veri-
(Continued)

fied dynamic learning data is applied to the AI model for continuous learning.

7 Claims, 5 Drawing Sheets

(56) References Cited

U.S. PATENT DOCUMENTS

| 2020/0019867 | A1* | 1/2020 | Nandakumar | ......... | G06N 3/048 |
| 2020/0082097 | A1 | 3/2020 | Poliakov | | |
| 2020/0082270 | A1* | 3/2020 | Gu | ......................... | G06N 3/045 |
| 2020/0302301 | A1* | 9/2020 | Anderson | ............... | G06N 3/08 |
| 2020/0320349 | A1* | 10/2020 | Yu | ......................... | G06N 20/00 |
| 2021/0143987 | A1* | 5/2021 | Xu | ....................... | H04L 63/062 |
| 2022/0150222 | A1* | 5/2022 | Kipnis | ............... | H04L 63/0421 |

OTHER PUBLICATIONS

Manvi S S et al: "Message Authentication in Vehicular Ad Hoc Networks: ECDSA Based Approach", Future Computer and Communication, 2009 International Conference On, IEEE, Piscataway, NJ, USA, Apr. 3, 2009 (Apr. 3, 2009), pp. 16-20, XP031499460, ISBN: 978-0-7695-3591-3 the whole document.

* cited by examiner

FIG. 4
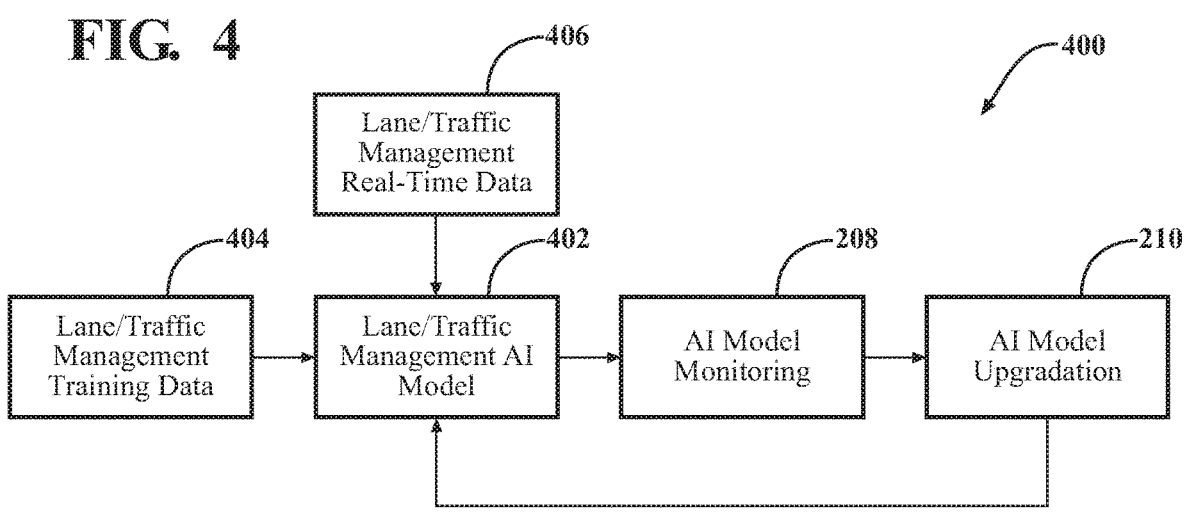
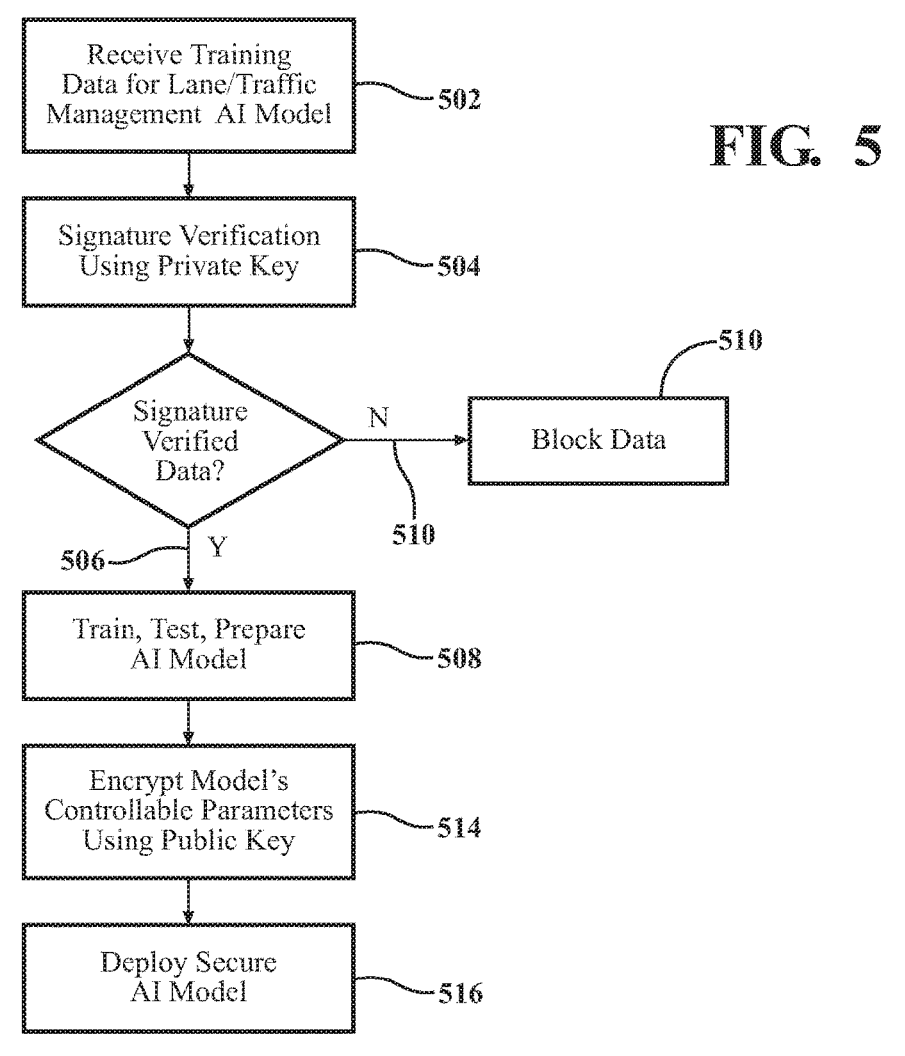
FIG. 5

SECURING ARTIFICIAL INTELLIGENCE MODELS FOR LANE/TRAFFIC MANAGEMENT IN AN AUTONOMOUS SYSTEM

CROSS-REFERENCE TO RELATED APPLICATIONS

The present application claims priority to IN provisional patent application serial no. 202011030333 titled Securing Artificial Intelligence Models For Lane/Traffic Management In An Autonomous System filed Jul. 16, 2020.

TECHNICAL FIELD

The disclosure relates to securing an artificial intelligence model from a cyberattack, and more particularly, to securing an artificial intelligence model for lane/traffic management in a vehicle's automated driver assistance system (ADAS) and/or autonomous vehicle.

BACKGROUND

Advanced driver-assistance systems (ADAS) are intended to increase safety and to improve the overall driving experience by automating vehicle systems. Many features of ADAS are adaptive, and therefore rely on inputs from multiple data sources. Modern vehicles are monitored and controlled by dozens of digital computers coordinated by internal vehicular networks to provide data to and from many data sources internal and external to the vehicle. Autonomous driving goes beyond assisting a human driver and is capable of navigating roadways and interpreting traffic control devices without human intervention. Vehicles with ADAS and/or autonomous driving functions may be connected, internally and externally, by way of cellular and/or wireless connections, making them susceptible to cyberattacks. Hereinafter, ADAS and/or autonomous driving will be referred to generally as ADAS.

Machine learning (ML), deep learning, to learn, train and prepare artificial intelligence (AI) models that may be applicable to ADAS and autonomous vehicles, for example to increase accuracy in lane management and traffic management. The AI models are developed using lane and traffic management data relating to the planning and control of traffic in urban areas including signals, signs, and forms built into the road, such as curbs, medians, rumble strips, etc. Static training data is used to train and test the model during its preparation. Once the AI models are deployed, they are continuously evaluated for their required goal and they are monitored and managed continuously with a periodic updates.

ADAS and autonomous vehicles make independent decisions using multiple connected AI-based systems by processing multisensory fused data. The serious nature of ADAS and autonomous driving applications makes it critical that data being used to train the models is good data and that it protected from cyber attackers. There is a need for sufficient protection of the AI models, particularly for AI models used in lane management and traffic management in ADAS and autonomous vehicles.

SUMMARY

The inventive subject matter proposes a system and method to secure AI models for lane/traffic management that may be utilized by ML systems in ADAS and autonomous vehicles. Active lane/traffic management is intended to increase peak capacity and smooth traffic flows on roads and the AI models use standardized signals from authentic government authorities which may be verified. This type of data is verifiable, leading to the insertion of multiple security solutions across vulnerable points in the ML system for AI models used in lane and traffic management. Securing the vulnerable points ensures training, testing, and developing AI models is carried out with data that has been protected from attacks.

In one or more embodiments examples are provided for a method for securing a lane and traffic management AI model in an ADAS system that includes receiving training data to prepare a lane and traffic management AI model for deployment in the ADAS, identifying, from the received training data, data supplied by a verifiable source, performing signature verification on the data supplied by the verifiable source using a private key associated with the verifiable source, blocking data other than the signature verified data, applying the signature verified data to the AI model for training and testing prior to deploying the AI model. The training data is lane and traffic management data supplied by a legal or government authority.

In one or more embodiments, after the AI model is deployed, the AI model is continuously monitored and dynamic learning data for lane and traffic management that is to be used to retrain and update the AI model is signature verified. Only signature verified data is used to retrain and update controllable parameters of the AI model and any other data will be blocked.

In one or more embodiments, examples are provided for a system for securing an artificial intelligence (AI) model for lane management and traffic management in a vehicle ADAS. The AI model is prepared using signature verified lane and traffic management training data supplied by a known, verifiable source. The signature verified data is verified using a private key associated with the verifiable source and only the signature verified data is used for training the AI model. Data other than data supplied by the verifiable source is blocked from the AI model prior to the AI model being deployed. After deployment, continuous learning data is also signature verified before it is used to retrain and update the AI model.

DESCRIPTION OF DRAWINGS

FIG. 4 is a block diagram of an exemplary lane/traffic management AI model;

FIG. 5 is a flow diagram depicting a detailed method for securing the AI model prior to deployment.

Figure 1:
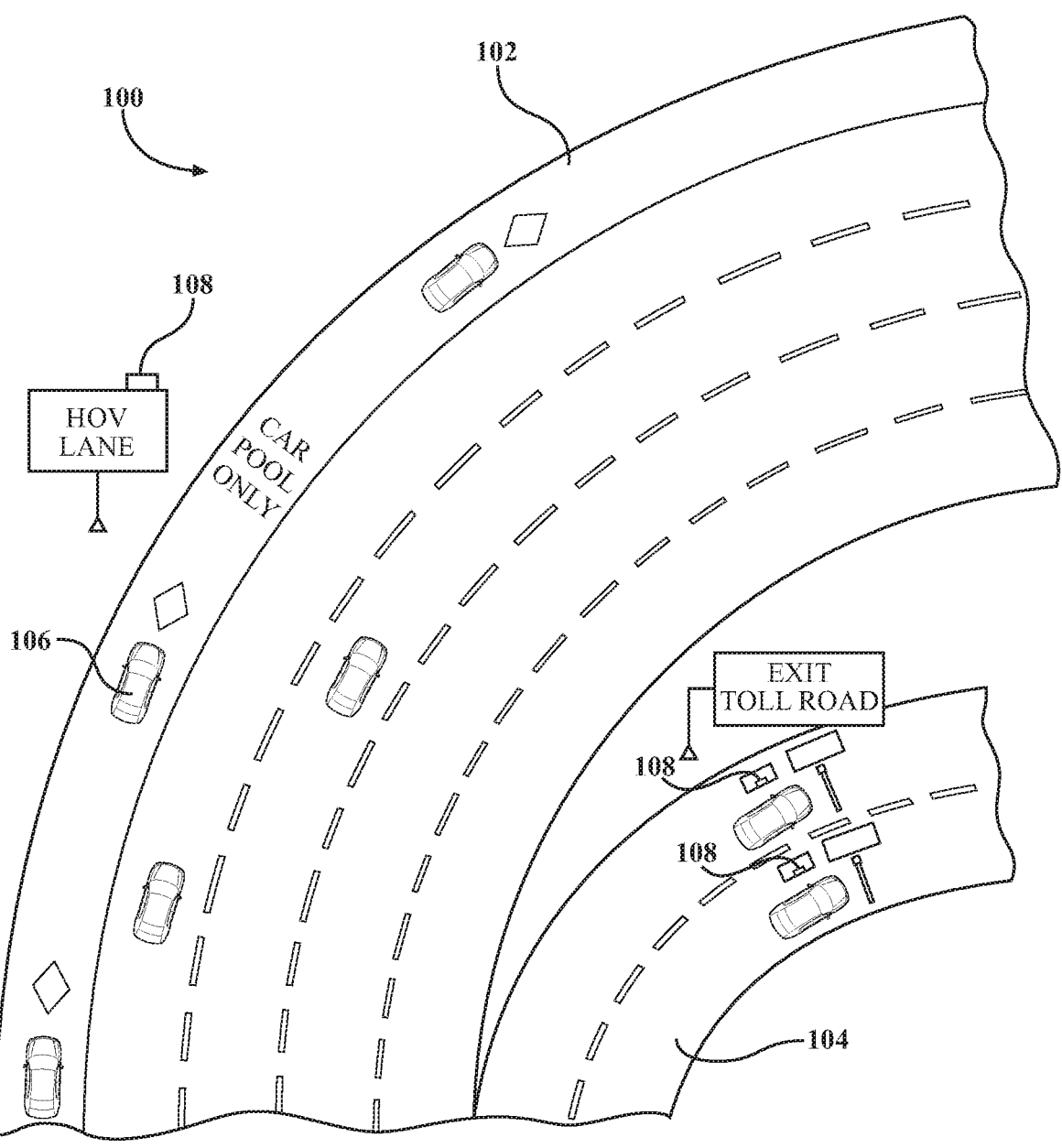
FIG. 1 is a bird's eye view of example environment having managed lanes that are the subject of lane management and traffic management.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

While various aspects of the present disclosure are described with reference to a particular illustrative embodiment, the present disclosure is not limited to such embodiments, and additional modifications, applications, and embodiments may be implemented without departing from the present disclosure. In the figures, like reference numbers will be used to illustrate the same components. Those skilled in the art will recognize that the various components set forth herein may be altered without varying from the scope of the present disclosure.

One or more embodiments provide a system and method for detecting and blocking adversarial attacks on a model developed and deployed in lane and traffic management for an ALAS (and/or autonomous) vehicle. Protecting model parameters from attacker data ensures the model for lane and traffic management is protected from bad data. If bad data is allowed to penetrate the model, it creates false positives and negatives that may result in failures. Such failures may be serious, particularly for an autonomous vehicle.

The term Electronic Control Unit (ECU) used hereinafter refers to any embedded system that controls one or more electrical systems or subsystems in a vehicle. Types of ECU include electronic/engine control module, powertrain control module, transmission control module, brake control module, central control module, central timing module, general electronic control module, body control module, suspension control module, control unit or control module. Vehicles may incorporate several of the individual control modules. Physical data refers to electrical and physical specifications of data connections. The physical data defines characteristics between a device and a physical transmission medium. This includes the layout of pins, voltage line impedance, cable specifications, signal timing, hubs, repeaters, network adapters, intensity, frequency, gradient, changing amplitude, modulation method etc.

Communication channels used hereinafter refer to physical transmission mediums such as a wire or a logical connection over a multiplexed medium such as a radio channel. Channels are used to convey information signals, for example a digital bit stream, from one or more transmitters or receivers. A channel has certain capacity for transmitting information, often measured by its bandwidth in Hz or its data rate in bits per second. Communication channels, also called pathways, use media and broadcast. Network based services refer to web, physical cable, Wi-Fi, mobile, Bluetooth, RF and GPS.

Any one or more of the ECUs, servers, receivers, or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. Any one or more the devices herein may rely on firmware, which may require updates from time to time to ensure compatibility with operating systems, improvements and additional functionality, security updates or the like. Connecting and networking servers, receivers or devices may include, but are not limited to, SATA, Wi-Fi, lightning, Ethernet, UFS, 5G, etc. One or more servers, receivers, or devices may operate using a dedicated operating system, multiple software programs and/or platforms for interfaces such as graphics, audio, wireless networking, enabling applications, integrating hardware of vehicle components, systems, and external devices such as smart phones, tablets, and other systems to name just a few.

FIG. 1 is a bird's eye view of example environment 100 having managed lanes that are the subject of lane management and traffic management. Data may be collected and or disseminated by authorities that control managed lanes. This data is used by ADAS systems and autonomous vehicles to improve a driving experience by controlling traffic flow. Lane management includes the management of lanes on a freeway that implement traffic flow using restrictions to allow certain vehicles to travel within the lane while restricting others. For example, high-occupancy vehicle (HOV) lanes, also called car-pool lanes 102, restrict lane usage to a vehicle 106 having at least a minimum number of passengers. Toll lanes 104 restrict usage by requiring payment of fee to use the road. Other restrictions may apply to the type of vehicle allowed in the lane and the direction of traffic flow in the lane for certain times of the day. Managed lanes are set, maintained, and monitored by departments of transportation or planning organizations of authentic government authorities. Data collected by government authorities includes, but is not limited to, data from various vehicle sensors, cameras 108 that detect a number of occupants or license plate data of the vehicle, historical data related to traffic volume, fees collected by toll booths, etc. Collected data and historical data is used by government authorities to constantly update lane and traffic management with the goal to improve the flow of traffic.

Lane and traffic management data is used in ML systems for training/testing/deploying an AI model that is subject to continuous learning in ML system for traffic assistance in ADAS and autonomous vehicles. Machine learning (ML) and deep learning systems use an artificial intelligence (AI) model based on training data to make predictions without necessarily being programmed to do so. The process of preparing the model includes training algorithms with training data to generate model weights and biases that carry the learned information about patterns in the data. Once the model is trained and tested it is deployed. After deployment, the model's performance is evaluated and tuned, using hyperparameters, to make the model effectively learn from the data on a continuous learning basis. The hyperparameters are learnable parameters that, when presented during training, are adjusted continuously towards values that have correct output. The combination of model parameters at the preparation stage and hyperparameters at the continuous learning stage are assembled together in the deployed model.

In an AI model, the training data is static and is mainly responsible for the algorithm's learning patterns from the data for specific requirements. The hyperparameters, or learnable data, are dynamic and are used in the training process after deployment to help the model learn and adapt to requirements by continuously changing the weights and biases of the model until minimum error is achieved. There are several points in the process of ML that introduce the potential for malicious data to be fed into the model's training and continuous updating stages.

Figures 2A, 2B:
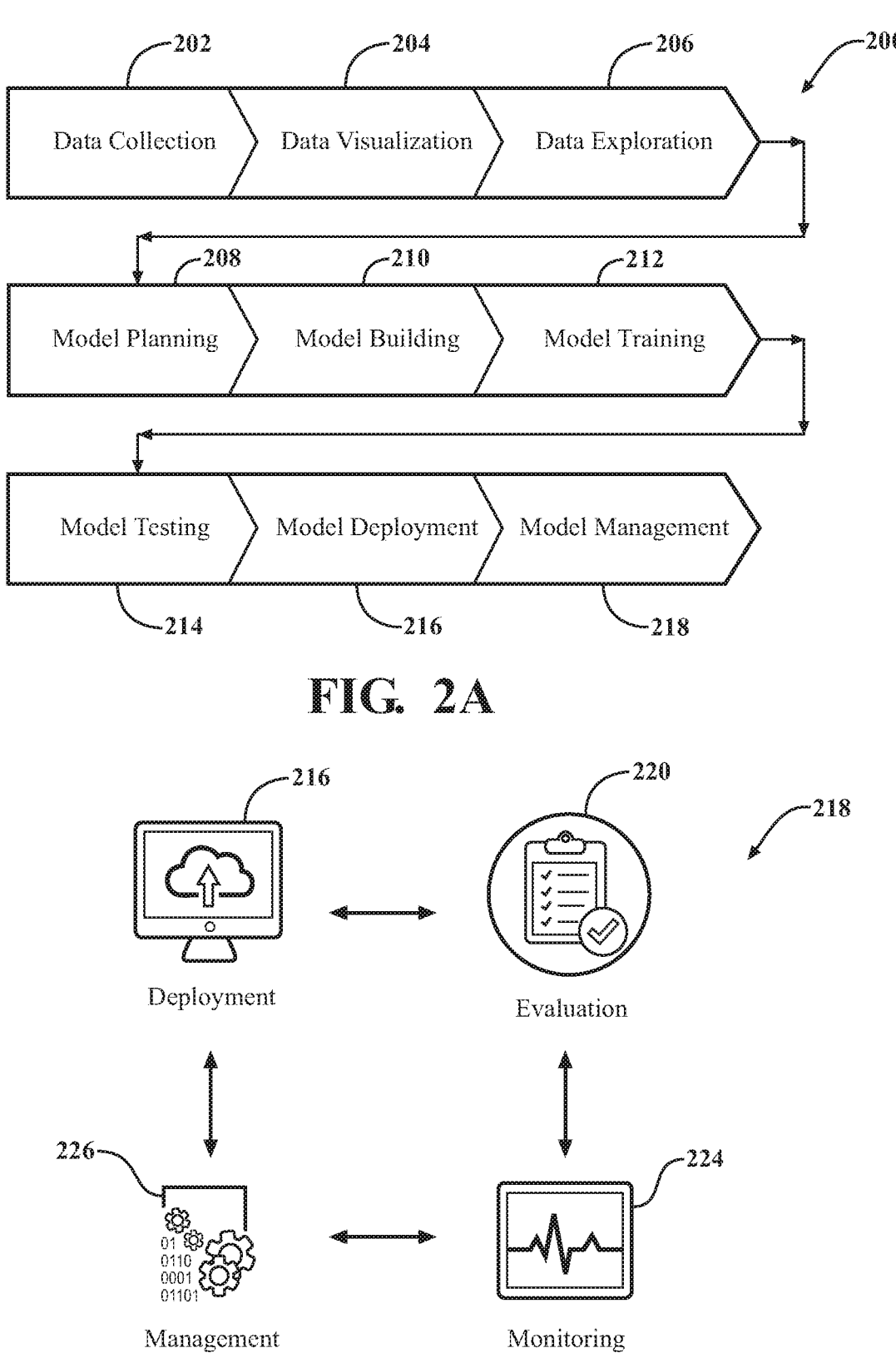
FIG. 2A is a general representation of a lifecycle of an AI model.
FIG. 2B is a general representation of the lifecycle of the AI model after it is deployed.

FIG. 2A is a general representation 200 of a lifecycle of an AI model that begins with data collection 202, data visualization 204, data exploration 206, model planning 208, model building 210, model training 212, model testing 214, model deployment 216 and model management 218. Before model deployment, the steps of collection, visualization, exploration, planning, building, training, and testing typically take place locally making them less susceptible to security breaches. The data at this stage is considered static data.

Once the model is deployed 216 and managed 218, it is continuously updated based on ML and deep learning of dynamic data being input to the model. Deployment of the AI model takes place across multiple platforms such as the cloud, apps, embedded controller, etc. using sophisticated tools. FIG. 2B is a general representation of the lifecycle of the AI model after it is deployed and managed 218. The model is continuously evaluated 220 and monitored. Settings, including parameters and hyperparameters are managed 226 through continuous learning to continuously improve the model with updates. The updated model is deployed 216 and the cycle continues.

For ADAS and autonomous vehicles, the transmission of data used in ML systems having AI models used in lane and traffic management, may take place by way of continuous broadcast, telematics or a transfer that is responsive to a request, sensor data, cameras, radar and lidar. Examples of transmission protocols for data may be by way of a wireless communication link, a network transmission, direct wired link, to name a few. This makes the data susceptible to cyber attackers. The models and the ML environment must have security measures sufficient for use in ADAS and autonomous vehicles.

Figure 3:
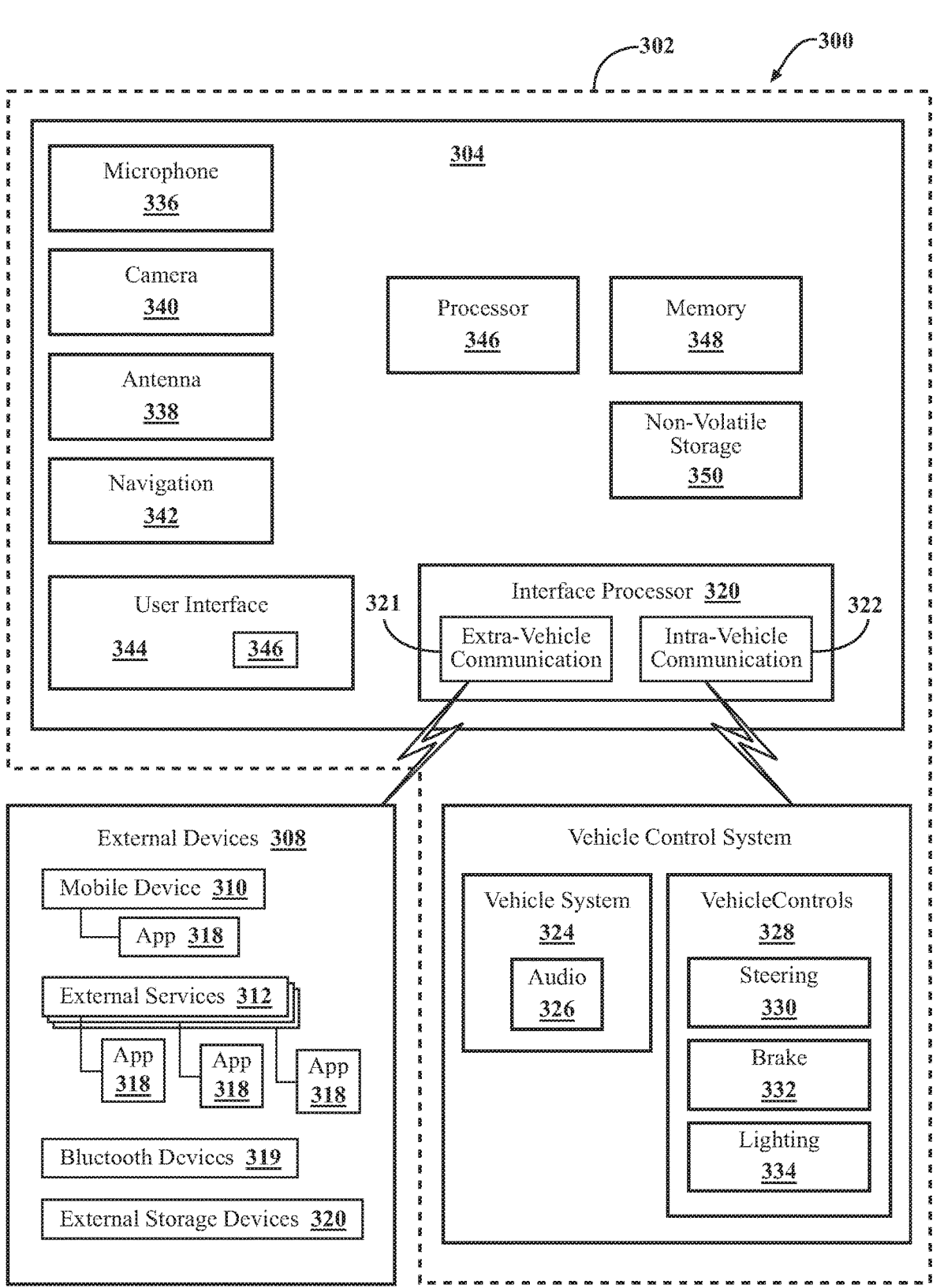
FIG. 3 is a block diagram of an in-vehicle computing system.

For ADAS and autonomous vehicles, the ML system and AI model may be manipulated by a vehicle-based computing system. FIG. 3 is a block diagram 300 of a vehicle 302 having a computing system 304 in the vehicle that communicates with vehicle control systems 306 that are internal to the vehicle 302 as well as devices 308 that are external to the vehicle 302. The external devices 308 may include mobile devices 310 such as smart phones and tablets that, while not integral to the vehicle, may be operable and connected within the vehicle 302. The external devices 308 may also include one or more external services 312 each having an app 318. Other examples of external devices 308 may include, but are not limited to Bluetooth devices 319, and external storage devices 320 such as universal serial bus (USB). The external devices 308 may have applications (Apps) 318 that run on the devices. The apps 318 collect and transmit data between the external device and the in-vehicle computing system 304 by way of an interface processor 320. The interface processor 320 may include an extra-vehicle communication module 321 for communicating with external devices 308 and an intra-vehicle communication processor 322 for communicating with the vehicle control systems 308 that are integral to the vehicle. Vehicle control systems 308 may include vehicle systems 324 such as audio 326 and vehicle controls 328 such as steering control 330, brake control 332, lighting control 334, etc.

The in-vehicle computing system 304 includes various sensors, including but not limited to one or more microphones 336, antennae 338, and camera sensors 340. In-vehicle systems, such as a navigation system 342, are also included in the in-vehicle computing system 304. The in-vehicle computing system 304 includes a user-interface 344, for example a touch screen 346. The sensors and systems interface with each other and with the computing system 304 for receiving and processing signals and data transmissions.

The in-vehicle computing system 304 includes a processor 346 and a memory 348, including non-volatile storage 350 that enable the in-vehicle computing system 304 to send and receive data from the various sensors, vehicle systems, external devices, external services etc. making them operable to carry out instructions, particularly for collecting data used to develop, deploy, and maintain an AI model for a ML system associated with lane/traffic management in ADAS.

FIG. 4 is a block diagram 400 of an exemplary lane/traffic management AI model 402 for an ADAS/autonomous vehicle. The AI model 402 receives training data 404 which is managed by the AI model 402 for training, testing, and deploying the model. Once deployed, the model also receives data 406 in real time. The real-time data is dynamic learning data being sent from sources either internal or external to the vehicle. For example, the external sources may be external services related to lane and traffic management data such as lane restrictions, toll collections, etc. from applications or devices external to the vehicle. The internal sources may be internal vehicle systems, such as cameras, microphones, other sensors on the vehicle, navigation system, user inputs, etc. The data received in real time is applied to the AI model for continuous learning. The AI model 402 is continuously monitored 408 to learn and create updates for upgrading 410 the model over time.

There are multiple points in this process where the AI model may be vulnerable to cyber-attacks, both during training/testing and again after deployment of the AI model. The inventive subject matter secures AI models used in lane/traffic management systems in ADAS/Autonomous vehicle systems during training and testing and also after the model has been deployed. The inventive subject matter blocks a path from an attacker at multiple attack points.

To accomplish this, the inventive subject matter considers the training data 404. Training data is data that is used to train and test the AI model prior to its deployment. In the instant example, training data is lane/traffic management data received from a verifiable source, such as a government authority in charge of lane and traffic management, used during the training and testing of the AI model to develop the AI model prior to its deployment. The source of this data makes it possible to implement security features that detect verifiable data and block data from attackers during the development stage of the AI model. Because the source of the training data from government authorities is verifiable, only data identified to come from verifiable sources for lane and traffic management will be used during training of the AI model. All other data is blocked.

After the AI model has been deployed continuous learning operations occur. During continuous learning, the model is continuously receiving data that is used for retraining the AI model. Any data received by the in-vehicle computing system used for model retraining or model improvement must also be secure. Verification may be determined through authenticated data patterns that are similar to data validated by the government authority. For example, when the AI model is receiving data, the data is validated and allowed for retraining only if it is traffic or lane management related data. No other data will be allowed. If an attacker attempts to feed malicious data during the models' continuous training, it will be recognized as being irrelevant because it is not coming from the verifiable source and will be blocked.

Figure 6:
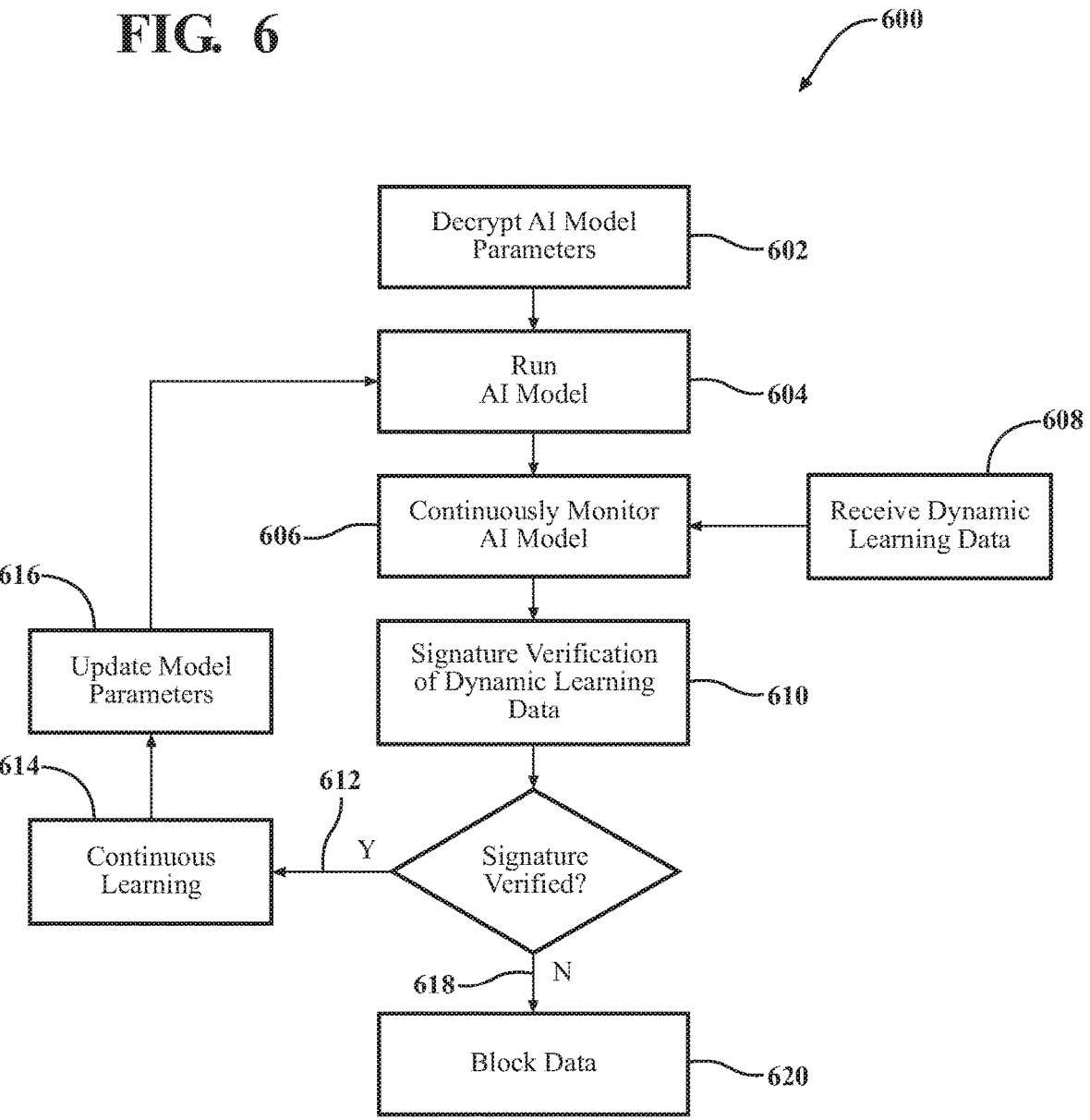
FIG. 6 is a flow diagram depicting a detailed method for securing the AI model after its deployment.

FIG. 5 is a flow diagram 500 depicting a detailed method for securing the AI model (hereinafter, model) prior to deployment and FIG. 6 is a flow diagram 600 depicting a detailed method for securing the model after its deployment. The method may be performed, for example, by the processor in the vehicle described with reference to FIG. 3.

Method 500 for securing the traffic and lane management model prior to its deployment includes receiving 502 training data. The training data for the AI model prior to deployment is static, comes from a known source and is a predefined type of data. Data for lane management and traffic management ADAS functions have predefined lane patterns and traffic signage defined by legal authorities. Therefore, attempted injection of any other data is assumed to be malicious and will be blocked. At step 504, a private key associated with the source of the data is used for signature verification of the training data. In this instance, the source is the government authority that supplies the data and the private key is a private key supplied by the source. Only signature verified data 506 is passed on and used to develop 508 the ADAS lane/traffic management AI model. Any form of data other than data that is not identifiable as coming from the known source cannot be signature verified 510 and it will be blocked at step 512. Signature verification ensures that the training data used to develop the model is secure.

At step 508, when the AI model is trained and tested, and controllable parameters are developed. At step 514, the controllable parameters are encrypted using a public key thereby securing the AI model prior to its deployment. The secured AI model is deployed at step 516.

FIG. 6 is a flow diagram 600 depicting a detailed method for securing the model after its deployment. Once deployed, the AI model is continuously learning and the controllable parameters, such as weights and biases, are being updated. The updated controllable parameters are used to continuously retrain the model. The process of continuously monitoring and updating includes data being supplied to and from the in-vehicle computing system from sensors, cameras, radar, lidar, telematics, etc. internal to and external to the vehicle as discussed at FIG. 3, again making the model vulnerable to another opportunity for an attacker to inject false or disruptive replacement model weights and biases. Therefore, the dynamic learning data that is being used to update the controllable parameters must also be protected from cyber attackers.

At step 602, after deployment, the encrypted model parameters are decrypted using a private key. The private key is managed by the OEM of the ADAS. The private key should be saved in a separate memory, such as a secure file system (SFS) replay protected memory block (RPMB). After deployment and decryption, the decrypted model runs continuously at step 604, performing the lane/traffic management tasks for which it was developed. The AI model is continuously monitored at step 606 using dynamic learning data 608 received from sources internal and external to the vehicle as described above with reference to FIG. 3. At this stage, the dynamic learning data 608 must be protected and verified prior to being applied to continuous learning.

During continuous learning operations the model parameters are evaluated for their required goal and they are monitored and managed continuously with a periodic update of the deployed model. The communication of dynamic learning data to and from the in-vehicle computing system creates vulnerable points that need to be protected, so the dynamic learning data 608 is signature verified 610 using a public key. Only signature verified data 612 is used for continuous learning operations 614 to protect the AI model. Through continuous learning 614 the controllable parameters are constantly updated 616. Any data that is not signature verified 618 is blocked 620. The ADAS performs tasks and operations which are expected from running the secure AI model 604 for lane and traffic management without fear of the model being compromised by an attacker. The inventive subject matter contributes to the security of upcoming autonomous vehicles that depend on AI models for their operation.

In the foregoing specification, the present disclosure has been described with reference to specific exemplary embodiments. Various modifications and changes may be made, however, without departing from the scope of the present disclosure as set forth in the claims. The specification and figures are illustrative, rather than restrictive, and modifications are intended to be included within the scope of the present disclosure. Accordingly, the scope of the present disclosure should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present disclosure, in addition to those not specifically recited, may be varied or otherwise particularly adapted to specific environments, manufacturing specifications, design parameters or other operating requirements without departing from the general principles of the same.

What is claimed is:

1. A computer-implemented method for detecting and blocking malicious attacks on an artificial intelligence (AI) model in a vehicle's advanced driver assist system (ADAS), the method comprising the steps of:

receiving training data to prepare a lane and traffic management AI model for deployment in the ADAS;

identifying, from the received training data, data supplied by a verifiable source;

performing signature verification on the data supplied by the verifiable source using a private key associated with the verifiable source;

blocking data other than the signature verified data;

applying the signature verified data to the AI model for training and testing prior to deploying the AI model;

encrypting the AI model and controllable parameters of the AI model to secure the AI model prior to deploying the AI model;

deploying the encrypted AI model;

performing continuous learning operations on the encrypted AI model using dynamic data patterns that are continuously communicated between the encrypted AI model and the ADAS after the AI model has been deployed;

during continuous learning operations, decrypting the AI model and the controllable parameters of the AI model using a private decryption key stored in a replay protected memory block;

accessing the dynamic learning data using the private decryption key and verifying the dynamic learning data by determining authenticated data patterns, the verified dynamic learning data is used for the continuous learning operations; and continuously monitoring the AI model to ensure the dynamic data patterns are protected and verified before being applied to the continuous learning operations.

2. The method of claim 1, wherein the data supplied by the verifiable source further comprises lane management and traffic management data and the verifiable source is a legal or government authority.

3. A non-transitory computer-readable storage medium including instructions that, when executed by a processor, cause the processor to perform steps for detecting and blocking malicious attacks on a lane and traffic management AI model for a vehicle advanced driver assistance system (ADAS), the steps comprising:

receiving training data;

identifying, from the training data, a predetermined data type supplied by a verifiable source;

performing signature verification on the predetermined data type supplied by the verifiable source using a private key associated with the verifiable source;

preparing an artificial intelligence (AI) model by training the AI model using only the signature verified data;

encrypting the AI model and its controllable parameters using a private key, the private key is stored in a replay protected memory block;

deploying the encrypted AI model;

performing continuous learning operations on the encrypted AI model using dynamic data patterns that are continuously communicated between the encrypted AI model and the ADAS;

during continuous learning operations, decrypting the controllable parameters of the AI model using a private decryption key stored in a replay protected memory block to access dynamic learning data that is verified by determining authenticated data patterns, the verified dynamic learning data is used for the continuous learning operations; and continuously monitoring the AI model to ensure the dynamic data patterns are protected and verified when applied to the continuous learning operations.

4. The computer-readable storage medium of claim 3, wherein the data type supplied by a verifiable source further comprises predefined lane patterns and traffic signs that are defined by the verifiable source.

5. The computer-readable storage medium of claim 4, wherein the verifiable source is a known legal or government authority.

6. A system comprising:

a memory storing a machine-learning (ML) system for a vehicle's advanced driver assistance system (ADAS);

a secure artificial intelligence (AI) model for lane management and traffic management, the AI model is prepared by the ML system using signature verified data supplied by a verifiable source, the signature verified data is verified using a private key associated with the verifiable source;

controllable parameters and the controllable parameters are encrypted prior to deployment of the AI model, the controllable parameters are encrypted using a public key maintained by an operator of the ML system;

data other than data supplied by the verifiable source is blocked from the AI model prior to the AI model being deployed;

after deployment of the AI model, the controllable parameters are decrypted by the ADAS using a private key stored in a replay protected memory block that is maintained by an operator of the ML system;

dynamic learning data is accessed using the private key and verified by determining authenticated data patterns, the verified dynamic learning data is used for continuous learning operations; and continuously monitoring the AI model to ensure the dynamic data patterns are protected and verified before being applied to the continuous learning operations.

7. The system of claim 6, wherein the data supplied by the verifiable source is lane pattern and traffic data and the verifiable source is a legal or government authority.

* * * * *